March 4, 1969  G. H. TAREAU  3,430,306
SEPARABLE ELEMENT CONNECTING DEVICE
Filed May 1, 1967
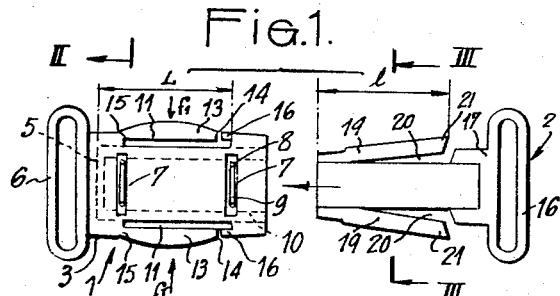
Fig.1.
Fig.2.
Fig.3.
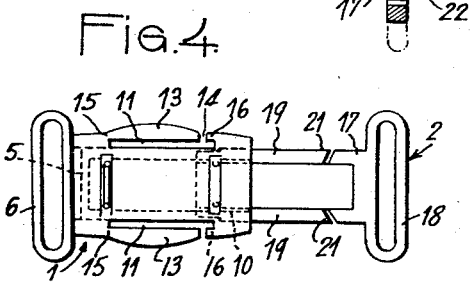
Fig.4.
Fig.2a.
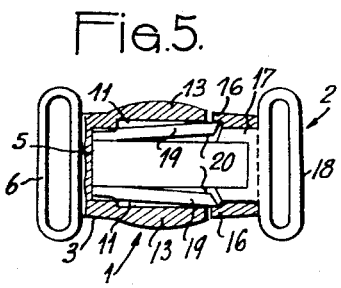
Fig.5.
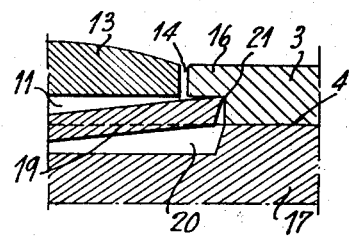
Fig.6.
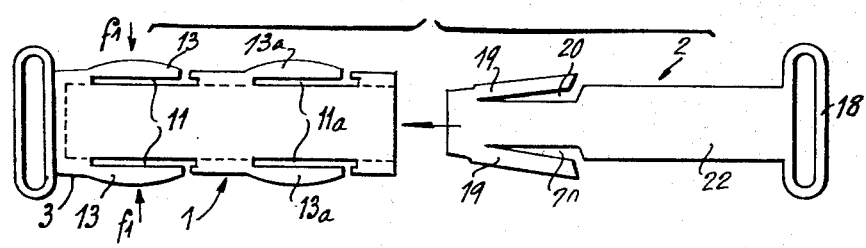
Fig.7.
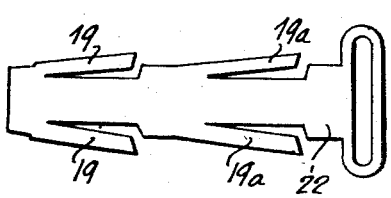
Fig.8.
Inventor
Georges Henri Tareau
By Alvin Browdy
Attorney

United States Patent Office 3,430,306
Patented Mar. 4, 1969

3,430,306
SEPARABLE ELEMENT CONNECTING DEVICE
Georges Henri Tareau, Paris, France, assignor to Tarwil-Rosoflex, Paris, France, a French company
Filed May 1, 1967, Ser. No. 635,093
Claims priority, application France, June 23, 1966, 66,615
U.S. Cl. 24—230
Int. Cl. A44b 19/02
10 Claims

ABSTRACT OF THE DISCLOSURE

A separable element connecting device is provided having a female tubular cover closed at one end and having two wings along its two edges which wings are capable of being elastically thrust inside two slots, and a male element having two retractable elastic tongues diverging from its longitudinal edges and at least partially penetrating locking apertures in the female cover adjacent the two slots, so that when the male element is placed in the female cover the elastic tongues pop through the locking apertures adjacent the wings, and so the device may be unlocked by depressing the wings thereby depressing the elastic tongues.

---

The present invention relates to a new separable element connecting device of simple but strong design, able to be used for connecting, joining, holding and assembling two parts or elements to be united, such as flexible or rigid bonds, elements of circuits for conducting heat or electricity, strips of material, necklaces, bracelets, belts, underclothing, wires, cords, cables of all kinds, zip fasteners, etc.

The object of the invention is also devised to afford important safety characteristics preventing all risk of accidental release of its united constituitive parts.

According to the invention, the device comprises a flat tubular cover closed at one end and comprising from its longitudinal edges at least two wings able to be elastically thrust inside two slots made in the thickness of said longitudinal edges to emerge in the inner housing of the cover through two locking apertures provided for the at least partial penetration of two retractable elastic small tongues, projecting laterally and in a divergent manner from the longitudinal sides and the engaging end of a flat body intended to be totally inserted in the tubular cover.

Various other characteristics of the invention will moreover be revealed by the detailed description which follows.

Forms of embodiment of the object of the invention are shown, by way of non-restrictive examples, in the attached drawing.

FIG. 1 is an elevation of the connecting device according to the invention.

FIGS. 2 and 3 are cross sections appreciably taken along the lines II—II and III—III of FIG. 1.

FIG. 2a is a cross section similar to FIG. 2 showing an alternative embodiment.

FIG. 4 is an elevation showing one of the assembling stages of elements forming the device.

FIG. 5 is an elevation, partly in section, showing the device in the connecting position.

FIG. 6 is a partial section showing, on a larger scale, a characteristic detail of the device placed in the position according to FIG. 5.

FIG. 7 is an elevation showing, on a smaller scale, a second form of embodiment of the device.

FIG. 8 is a partial elevation showing an alternative execution of the device according to FIG. 7.

According to the first form of embodiment shown in FIGS. 1 to 6, the connecting device according to the invention is principally formed by a female element 1 and a male element 2 fitting into one another, able to be made of any suitable material chosen in relation to the particular application for which the device is provided.

The female element 1 comprises a hollow body or lengthened tubular cover 3, preferably of flat section, delimiting an internal housing 4 also of slight rectangular section. This housing 4 is closed, level with one of the transversal ends of the body 3, by an end 5 which can be made for forming outside said body, a fixing member 6. In the example of embodiment shown, the member 6 assumes the shape of a loop or eyelet able, however, to be replaced by a clip, hook or a perforated, pierced or splayed strap.

Replacing or in combination with the member 6, the body 3 can also have, in one of the sidewalls of the tubular cover, two transversal rectangular apertures 7. These apertures are made facing two series of holes 8 drilled in the opposite side wall of the tubular cover. This form of embodiment is more particularly provided for ensuring the fixing of the female element 1 on any kind of support, similar to a button sewn on by machine. Actually, the needle of the latter can be made alternately to pass through the holes 8 of each series for ensuring the connection with the spool thread, seeing that the presence of the apertures 7 whose transversal extent, as well as width are provided sufficiently wide for the passage of most of the sewing machine needles utilised. To avoid this thickness of the thread connecting the holes 8 projecting inside the housing 4, the inner face of the corresponding side wall advantageously comprises a groove 9 between these holes. For the same purpose, FIG. 2a shows an alternative embodiment, according to which the inner face of the side wall has holes 8 delimiting a clearance 10 extending substantially along the entire length of said wall.

The tubular hollow body 3 has, in the appreciably middle zone and thickness of the longitudinal sides, two slots 11 made to emerge through apertures 12 into the housing 4. These slots 11 are, moreover, provided over and extent appreciably wider than two wings or middle bosses 13 formed from the longitudinal edges of the body 3. A transversal cut 14 is made in the thick part of each longitudinal edge 3, and as far as the slot 11, so that the corresponding boss 13 is solely connected to the body 3 by a base 15 situated near to the member 6. The thickness of each base 15 is determined in relation to the material of which the female element 1 is made for imparting to the boss 13 a certain elastic deformation ability, especially under a stress directed in the direction of the arrow $f_1$. The cut 14 is, moreover, recessed in relation to the corresponding end of the slot 11, so as to provide in the thick part of the longitudinal edge, a rigid nose or shoulder 16 extending partly above the slot 12.

The male element comprises a rigid flat body 17 whose section and length exactly correspond to the dimensions of the housing 4. In a similar manner to the female element 1, the body 17 is provided at one of its ends, with an attaching member 18 having the shape of a buckle or transversal eyelet. Although not shown, the buckle 18 can be replaced by a perforated, pierced or splayed strap, or even by a hook or clip. The body 17, of harpoon or arrow shape, comprises two small elastic side tongues 19 isolated from the longitudinal edges by two slits 20. The small tongues 19 are made so that when out of action they diverge towards the attaching member 6, to an extent that their end angular parts 21, which are noseshaped, propject transversally in relation to the longitudinal sides of the body 17. The length $l$ of these small tongues 19, comprised between the noses 21 and the engaging end of the body 17 is chosen to be slightly less than the length $L$ comprised in the female element 1 between the bottom 5 and the end of the slots 11 extending under the shoulders 16.

As can be seen in FIG. 3, the two side faces of the body 17 can have hollow clearances 22 corresponding to the thickness of the thread connecting the holes 8 of the female element 1 when the inner face of the side wall with said holes does not delimit either grooves 9 or clearances 10.

As can be seen from FIG. 1, the assembling of the separable elements 1 and 2, is done by introducing the body 17 of the male element 2 into the housing of the female element 1. During this introduction, shown in FIG. 4, the small tongues 19 are elastically deformed for being brought inside the slits 20 in the exact extension of the longitudinal edges of the body 17. The introducing of the latter, started as described above, is continued until complete engagement when the entry end is brought into abutment against the end 5 of the tubular cover 3. In this position, shown in FIG. 5; the small tongues 19 are in exact coincidence with the apertures 12, so that by reaction to the elastic deformation, then enter into the slots 11 at least by their terminal parts forming noses 21. As can be more clearly seen in FIG. 6, the noses 21 are totally engaged through the apertures 12 in the slots 11 and are held under a relatively slight tension by the shoulders 16, without surface contact with the bosses 13. This particular characteristic is provided to avoid subjecting the bases 15 to bending stresses likely to cause more or less speedy deterioration.

After totally engaging the body 17, the noses 21 of the small tongues 19 are placed facing the corresponding ends of the slots 11 which prevent any possibility of disengaging under traction stress relatively exerted between the elements 1 and 2.

For separating the male and female elements, it is necessary to exert on the bosses 13, two simultaneous pulls in the direction of the arrows $f_1$, so as to cause their partial entry into the slots 11. During this entry, the parts of the bosses 13 contiguous to cuts 14 thrust the small tongues 19 into the slots 20 to retract the noses 21 from the shoulders 16. It is then possible by a relative pull to release the body 17 from the tubular cover 3.

Another form of embodiment of the device is shown by FIG. 7, according to which the female element 1 comprises a longer body 3 which has two boss assemblies 13 and 13a which are consecutive and made exactly as described above. The male element 2 forms a flat body 22 of equal length to that of the body 3 and which delimits, level with its front part, two small tongues 19, identical to those of the body 17.

When assembling the male and female elements described above, the small tongues 19 of the body 22 are made to engage first in the apertures 12a corresponding to the first boss assembly 13a level with which they make a first locking which can be called "safety" or "regulating," according to the application sought. Final locking is obtained by continuing the engaging of the body 22 so that the small tongues 19 engage in the apertures 12 of the second boss assembly 13.

This form of embodiment has an important advantage with regard to the risks of unintentionally separating the female and male elements 1 and 2. Actually, if for any reason the bosses 13 are simultaneously thrust in the direction of the arrows $f_1$, the body 22 of the male element 2 can be made to partially disengage itself from the tubular body 3, until the small tongues 19 come opposite to the apertures 12a of the bosses 13a. The automatic engaging of the small tongues 19 in these apertures then sets up an automatic safety locking which prevents any accident whereby the fastening comes undone.

FIG. 8 shows that the body 22 can eventually comprise two small tongue assemblies 19 and 19a made for simultaneous engaging in the apertures 12 and 12a of the boss assemblies 13 and 13a. In such case, the disengaging of the body 22 is obtained by simultaneously causing the bosses 13 and 13a to be pushed in.

The invention is not restricted to the examples of embodiment shown and described in detail, for various modifications can be applied thereto without going outside of its scope.

I claim:
1. A separable element connecting device comprising a male element and a separable cooperating female element, said female element comprising a generally flat hollow tubular cover having two wide sides and two narrow sides and being closed at one end and open at the opposite end thereof, the opposite narrow sides of said cover each defining a wing portion separated by a slot from said wide sides at the central portion of said cover and anchored at one end thereof to said cover near the closed end thereof, said wings being capable of being elastically deformed into said slots, said slots opening into the interior of said cover through locking apertures;

said male element comprising a flat body complementary to said tubular cover and having two wide sides and two narrow sides, a pair of retractable elastic tongues projecting laterally and in a divergent manner each from one of said two narrow sides of said flat body, said elastic tongues being connected to said flat body near the leading end thereof, said elastic tongues on said male element at least partially penetrating said locking apertures of said female element.

2. A device in accordance with claim 1, wherein said two separating slots are rectangular and extend axially a distance exceeding the length of said wing portions to define retaining shoulders each extending above the corresponding locking aperture adjacent the unanchored end of each said wing portion.

3. A device in accordance with claim 2, wherein said elastic tongues are of a length equal to said locking apertures.

4. Device according to claim 1 characterized in that the tubular cover transversally delimits two groups of consecutive wing portions able to ensure independently the locking of the small elastic tongues, said flat body having a length equal to that of said tubular cover, and said elastic tongues being located at the leading end of said flat body.

5. Device according to claim 1, characterized in that the flat body has two groups of small lateral tongues which are elastic and able to be simultaneously engaged in locking slots of two groups of elastic bosses provided in the tubular cover.

6. Device according to claim 1, characterized in that the tubular cover and flat body are each provided with an attaching member at the end opposite to their introducing parts.

7. Device according to claim 1, characterized in that the tubular cover has, in one of its wide sides, two groups of two holes, and facing in the opposite wide side wall, two rectangular slots.

8. Device according to claim 7, characterized in that the inner face of the wide side with the two groups of holes delimits a groove between each of the holes of a group.

9. Device according to claim 7, characterized in that the inner face of the side wall having two groups of two holes, delimits an axial clearance whose transversal extent corresponds to the distance between the holes.

10. Device according to claim 7, characterized in that the flat body has two longitudinal clearances on its two wide sides, whose transversal width corresponds to the distance between the holes in one of the wide sides of the tubular cover.

References Cited

UNITED STATES PATENTS

| | | | |
|---|---|---|---|
| 1,456,305 | 5/1923 | Grassman | 24—230 |
| 2,858,593 | 11/1958 | Irizarry | 24—230 |
| 3,200,464 | 8/1965 | Cousins | 24—230 |

FOREIGN PATENTS

| | | |
|---|---|---|
| 570,156 | 4/1924 | France. |
| 676,151 | 2/1930 | France. |

BERNARD A. GELAK, *Primary Examiner.*